United States Patent [19]
Peterson

[11] Patent Number: 5,157,861
[45] Date of Patent: Oct. 27, 1992

[54] QUICK DISCONNECT SYSTEM FOR FISHING LINE

[76] Inventor: Roger Peterson, Rte. 1 Box 316, Sweeny, Tex. 77480

[21] Appl. No.: 797,432

[22] Filed: Nov. 22, 1991

[51] Int. Cl.[5] ............................................. A01K 91/04
[52] U.S. Cl. .................. 43/44.83; 43/44.85; 24/116 A; 24/669
[58] Field of Search ................. 43/44.83, 44.84, 44.85; 24/116 A, 669, 702; 403/360, 381

[56] References Cited

U.S. PATENT DOCUMENTS

| | | | |
|---|---|---|---|
| 2,714,269 | 8/1955 | Charles | 24/116 A X |
| 3,091,885 | 6/1963 | Ulsh | 43/44.83 X |
| 3,164,922 | 1/1965 | Kearns | 43/44.85 X |
| 3,210,883 | 10/1965 | Ulsh | 43/44.83 X |
| 3,332,163 | 7/1967 | Stewart | 24/116 A |

FOREIGN PATENT DOCUMENTS 2034396 6/1980 United Kingdom ............... 43/43.16

Primary Examiner—Richard K. Seidel
Assistant Examiner—Patty E. Hong
Attorney, Agent, or Firm—Gunn, Lee & Miller

[57] ABSTRACT

The present disclosure is directed to co-acting male and female fishing line connectors. The female member is an elongate body having an internal cavity. It is sized and shaped to receive internally a sphere. The sphere permits quick insertion or removal. The sphere is affixed to an elongate link which is apply clamped and positioned at an axial passage through the body, and further includes a second sphere on the link, the two spheres serving as clamps to hold and position the connective link at a desired location on the female member. The male member thus comprises the two spheres and connective link. Quick connection and disconnection is achieved, and axial pulling is handled readily by the equipment with rotation.

8 Claims, 1 Drawing Sheet

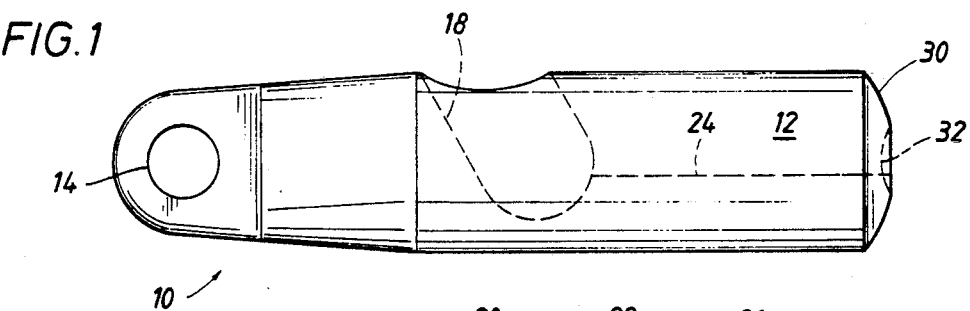
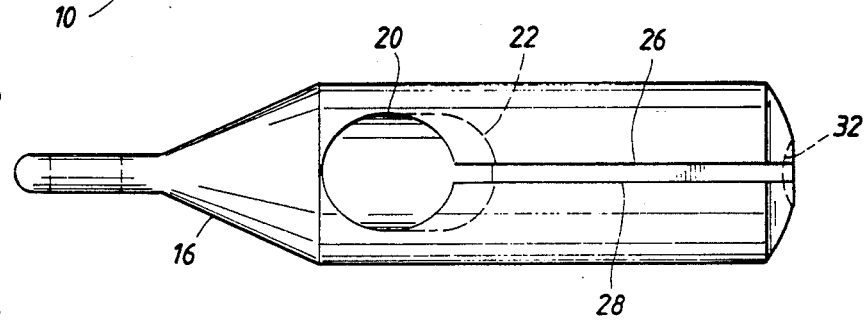
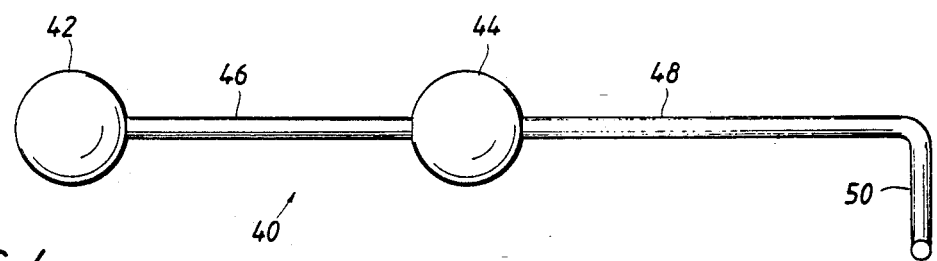
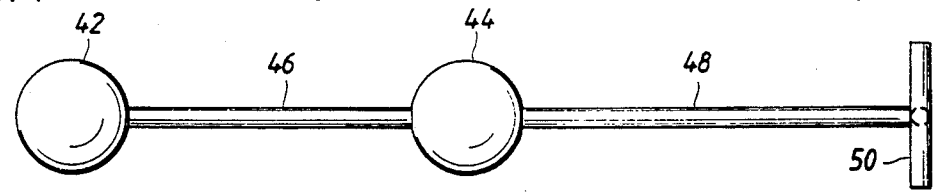
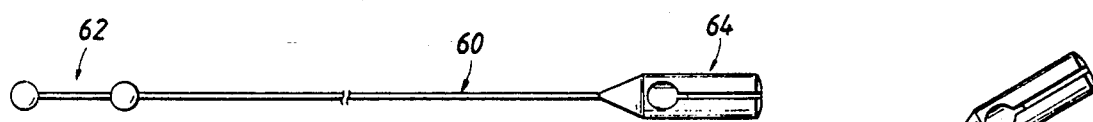
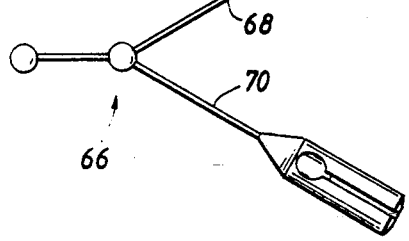

QUICK DISCONNECT SYSTEM FOR FISHING LINE

BACKGROUND OF THE DISCLOSURE

In rigging a fishing line to a rod and reel, it is necessary to connect the fishing line to a leader and then the leader is connected to the hook or lure. In addition to that, there will often be a weight attached to the leader. Sometimes there will also be a cork. All of these implements are now connected by means of snaps and swivels. Sometimes, an individual will not use snaps but will connect everything together by means of knotted line or leader material. In all instances, it is relatively difficult to make these connections, and it is even more difficult to unmake the connections. When fishing line or leader is knotted, it cannot be simply disconnected; it must be cut and thrown away. The present disclosure is directed to a non-metallic material which is formed into a connective apparatus for a quick disconnect mechanism. More particularly, it is a quick disconnect system which utilizes separated male and female components which join in a snap lock arrangement. This is accomplished with molded components, i.e., components which are able to be mass produced in a multi-cavity mold for casing of nylon or other long chain polymer materials. It provides a relatively simple structure by appearance, and the simple structure is likewise able to be assembled and disassembled repetitively with simple hand manipulation.

The female apparatus is formed with an eyelet which connects readily to a leader or fishing line. It has an internal cavity which is sized to receive a spherical member, and there is a lengthwise slot extending from the central cavity. The male member is equipped with two spheres spaced from one another and they are connected by a rod like portion which is located in the lengthwise slot cut in the female member. This enables a snap action joinder, the snap action anchoring the male member at two locations with respect to the female member. One sphere is internally placed and is captured while the other is externally placed to serve as a locking mechanism. When joined, they hold quite well against the rigors of fishing and will maintain a quality flexible connection. When released, they can readily come apart in just a second or two and this enables subsequent refastening with equal speed.

The present apparatus can be scaled in a variety of sizes. It can be scaled for use with light weight, fresh water tackle working with perhaps eight to twelve pound test line. Larger versions can be used with upward of perhaps 100 pound test line and intermediate sizes are likewise permitted. While larger sizes can be obtained simply by scaling the equipment up in size, it is thought that the greater and more desirable arena of use of the present apparatus relates generally to the small to medium sizes, those especially sized for and adapted for cooperation in light weight, fresh water fishing line such as ten pound test line.

SUMMARY OF THE PRESENT DISCLOSURE

This disclosure is described as a cooperative fastener system which enables a quick disconnect mechanism to be implemented at the end of a fishing line or leader to connect the hook, sinker and other equipment. This quick disconnect mechanism is formed of cooperative male and female components. With regard to the female component, it is constructed in the fashion of an elongate generally cylindrical structure having an eyelet at one end. It has conforming surfaces and a lengthwise slot cut in it for fastening of the male member. The female member jointly acts against a pair of spaced spheres on the male structure and this enables a clamping action to be achieved. The male member includes the two spheres mentioned and they clamp in a particular location so that they are able to relatively hold the female member. They enable the quick connect disconnect arrangement. When assembled and disassembled, movement from one state to the other is accomplished in just a few seconds. Once alignment is accomplished and a connection is made, a fast and durable connection is assured to the user. Both the male and female members include means which connect with the fishing line and leader.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a side view of a female coupler in accordance with the teachings of the present disclosure;

FIG. 2 is a top view of the female coupling device in FIG. 1 showing additional details of construction;

FIG. 3 is a top view of a male coupler sized in cooperation with the female coupling apparatus shown in FIGS. 1 and 2;

FIG. 4 is a side view of the male device shown in FIG. 3 wherein the view of FIG. 4 is orthogonal to FIG. 3;

FIG. 5 is a leader constructed in accordance with the teaching of the present disclosure including the male and female quick disconnect components at opposite ends thereof; and FIG. 6 is a three-way system utilizing two female connectors to provide a branched member for connection to multiple fishing components such as weights, hooks and sinkers.

DETAILED DESCRIPTION OF THE PREFERRED EMBODIMENT

Attention is now directed to FIG. 1 of the drawings where the numeral 10 identifies the female coupler of the present disclosure. It is preferably formed of a relatively hard plastic material, and a suitable hardness of cast nylon will suffice. Other materials can be used instead of this. The female coupler in FIG. 1 has been enlarged several fold. In actuality, it will be perhaps about one to two centimeters in length for common sizes. It is constructed of a solid body 12 which further incorporates an eyelet 14 at one end. This eyelet is sized to receive a fishing line or leader which is tied in a knot at the eyelet. There is a tapered area 16 where it defines a cylindrical body portion 12. It is cylindrical in cross section, thereby having sufficient body to define a locking cavity 18. A locking cavity 18 has an entrance sized and shaped to receive a sphere, the cavity lip being identified at 20 in FIG. 2 of the drawings. This cooperates with the male coupling device as will be described. The cavity 18 is inclined at an angle so that there is room in it to capture a sphere which is pushed into the cavity and which moves toward the end opposite the eyelet 14. The dotted line at 22 in FIG. 2 shows the under cut location of this cavity. There is a narrow slot or grove which is formed along a radial line which has a lower edge at 24 in FIG. 1 of the drawings. The slot is also defined by a pair of facing edges 26 and 28 in FIG. 2 of the drawings. This slot extends from the under cut cavity at 18 to the remote end 30. The end 30 is approximately dome shaped, but it has a chord forming an end located dimple 32. The dimple 32 is incorporated to lock with the male member as will be described. The slot 24 which extends to the end of the female body is included so that nothing is able to escape while the male member is fastened in this axially located slot. More will be noted concerning this cooperation.

Attention is now directed to FIGS. 3 and 4 considered jointly where the numeral 40 identifies the male member. There is a first sphere 42 and a similar and second sphere 44. They are preferably the same diameter and therefore have the same radius of curvature. They are sized so that they will fit somewhat snugly in the opening at 18 in FIG. 1 of the drawings and also against the dimpled region at 32. In other words, the dimple has a specific radius of curvature, and the sphere 44 matches it. The two male spheres are joined by a connective link 46. In addition there is an extra length 48 which aligns with the link at 46. The two spheres 42 and 44 are locked in place and fit against the conforming curving surfaces 22 and also 32. The spheres 42 and 44 are spaced from each other so that a measure of tension is placed in the connective link 46 between the two male spheres.

Operation of this device will perhaps enhance the explanation. Briefly, the left hand sphere 42 is forced through the circular opening at 20 in FIG. 2 and is pushed into the recessed cavity which is inclined at an angle as shown in the drawings. Further it is locked at that location because it is pulled to the right as viewed in FIGS. 1 and 2. The connective link 46 is pushed into the slot defined by the facing walls 26 and 28. The connective link positions the male sphere 44 so that it latches into or fits against the dimple 32. It is, of course, external to the female member. It is aligned axially so that the connective link 46 is centered in the female member. The two spheres are spaced from one another so that they hold the connective link slightly or substantially in tension. The grip between the mated male and female members is sufficient to hold the parts in all circumstances of use. This tension creates a modest amount of resistance so that the sphere 44 has to roll over the dimple edge at the end of the female body to be seated by the dimple 32. This movement provides latching and locking movement. This movement enables the two spheres to be quickly anchored in position against the female member. When they are so anchored, this positioning assures that the extension 48 is aligned with the female member. An eyelet connective member 50 enables the cooperative members 10 and 40 to be coupled to an eyelet (for example) on a hook. This enables a user to accomplish the connection in just a few seconds.

FIGS. 5 and 6 show alternate versions. A leader assembly 60 is shown in FIG. 5. It can be of any length; it has an integrated male member at 62 at one end, and an integrated female member 64 at the opposite end.

The leader joins with them and forms a single structural member. For instance, the eyelet in the female end can be omitted and the leader integrally joins to it to provide unitary construction. This can be extended to the arrangement in FIG. 6 where the numeral 66 identifies a three-way construction which has similar first and second female fittings. They connect with leader portions at 68 and 70. In summary, the three-way connection is similar to the leader shown in FIG. 5 except that it provides two female members which branch and hang freely. As will be understood, the construction shown in FIG. 6 can fasten easily and readily to the leader construction shown in FIG. 5 of the drawings.

For a fisherman using ten or twelve pound test line, the apparatus of the present disclosure is typically one to two centimeters in length. The female member is about 1.2 to 1.5 centimeters. It is constructed so that the male member attaches to it by simply applying relatively direct and easy thumb pressure to press the first sphere 42 fully into the interior cavity of the female member, aligning the connective link 46 in the slot, and pushing it to the bottom of the slot which automatically moves the second male sphere to the end location where joinder is completed. It is held at that location by the coacting dimpled end construction. This enables the two members to join and enables line and leader to be joined or alternatively, the hook, sinker or weight and cork to be affixed to the line. Multiple hooks can be installed through the use of the three-way connective arrangement shown in FIG. 6 of the drawings. The present apparatus is injection molded in fabrication. In the ideal construction, the bottom of the cavity in the female member has a curvature which permits the male sphere to nest against it. The width of the connective link 46 approximately matches the width of the slot formed in the length of the female member. This provides sufficient friction to hold the members together. By the application of a lateral pulling force, the male member can be snapped free by unseating the external sphere, bending the connective link 46 to remove it from the slot, and then pulling the male sphere out of the female cavity.

In operation, the quick disconnect device of the present construction does not permit full rotation between the male and female members. They are joined and held by nesting of the male sphere 42 in a conformed cavity. Surface contact friction acts on the male sphere to hold it in the female member cavity. Rotation is prevented by the frictional contact in the cavity and in the slot engaging the connective link.

An important factor is that axial stress placed on the cooperative male and female members is directed to the connective link. The stress acts on the joined members where the stress is imparted to the connective link 46. The stress is distributed by the spherical member 42 which seats internally within the female members so that the stress impacts the entire surface area of the female member. Stress is thus transferred through the connective male and female members by this connection. Further the stress is axially aligned because the connective link is located at or coincident with the center line of the female member. In the preferred form of construction, the connective link 46 thus aligns with the seat location where the internal cavity is located and distributes stress from the male member into the body of the female member. One modification of this device is to increase the diameter of the connective link to about double that of the fishing line so that it does not stretch.

In that event, the male and female interconnection does not change much with a change fishing line load.

From the foregoing, it will be observed that a quick connect and disconnect arrangement is accomplished. The increase in tension observed when catching a fish transfers through the female member to more readily assure that the assembled male and female members hold together without breaking free.

In summary, the snap action accomplished by this apparatus competently and routinely handles stress applied to it when loaded with a weight on the fishing line for instance, in casting, catching a fish, etc.

While the foregoing is directed to the preferred embodiment, the scope thereof is determined by the claims which follow:

What is claimed is:

1. A fishing line connector, comprising:
   (a) a cast elongate female body having a slot formed therein along the length of said body and terminating at an internal cavity wherein said slot and cavity are adapted to receive and hold
   (b) a mating and co-acting male member having
      (1) a mating and co-acting surface in contact with the internal cavity of the female member,
      (2) an elongate connective link positioned in said slot along the length of the female body and extending there beyond to enable connection with a fishing line,
      (3) said surface comprising a portion of a surface of rotation conformed to the surface within said internal cavity, and
      (4) wherein said male member incorporates an externally located sphere conforming to and locking against a co-acting surface on the exterior of said female body; and
   (c) fishing line connector means connected to said female body.

2. The apparatus of claim 1 wherein said female body comprises a solid, elongate cylindrical body and said internal cavity connects to an aligned passage means for said leader portion.

3. The apparatus of claim 2 wherein said internal cavity includes a semi-spherical surface axially centered with respect to said cavity.

4. The apparatus of claim 2 wherein said cavity is sized to receive a sphere seated at said semi-spherical surface.

5. The apparatus of claim 4 wherein said female body is axially aligned with said aligned passage means, and said body has an external locking means thereon for locking against said male member.

6. A fishing line connector comprising a cast elongate female body having a slot formed therein along the length of said body and terminating at an internal cavity, wherein said slot and cavity are adapted to receive and hold a mating and co-acting male member having a mating and co-acting surface in contact with the internal cavity of the female member, and said male member further includes an elongate connective link positioned in said slot along the length of the female body and extending there beyond to enable connection with a fishing line and said female body has a fishing line connector means and further wherein said male member comprises spaced apart enlargements on an elongate leader portion wherein the elongate leader portion is adapted to be positioned in said slot in said female body, and is locked at that location.

7. The apparatus of claim 6 male member enlargements are a pair of spheres.

8. The apparatus of claim 7 wherein said female body internal cavity has a surface receiving said male member sphere.

* * * * *